United States Patent Office 3,788,837
Patented Jan. 29, 1974

3,788,837
METHOD FOR MELTING PARTICULATE METAL
Gunter Geck and Hans Jurgen Langhammer, Hagen, Germany, assignors to Klockner-Werke AG, Duisburg, Germany
Continuation-in-part of abandoned application Ser. No. 862,762, Oct. 1, 1969. This application Mar. 22, 1972, Ser. No. 237,158
Int. Cl. C21c 7/04
U.S. Cl. 75—55        6 Claims

ABSTRACT OF THE DISCLOSURE

A charge of scrap iron is melted in an upright elongated, in part refractory lined melting chamber by a disc-shaped flame acting on the lower end of the charge whereby the melted metal flows onto the bottom wall of the chamber and becomes interposed between the bottom wall and the flame so that the bottom wall is protected by the interposed metal from the flame. The flame is produced from a mixture of fuel and oxygen blown into the melting chamber through a lance. The melted scrap iron is discharged into a container containing an amount of liquid pig iron and the percentage of oxygen in the fuel-oxygen mixture is adjusted in such a manner that the melted metal discharged from the melting chamber contains a percentage of FeO which will produce in the container together with added lime a reactive slag so that refining of the metal bath in the container into steel will take place without blowing oxygen directly into the metal bath in the container.

REFERENCE TO RELATED APPLICATION

The present application is a continuation-in-part application of the application Ser. No. 862,762 filed Oct. 1, 1969 now abandoned.

BACKGROUND OF THE INVENTION

The present invention relates to a method for melting metal scrap, in particular steel scrap, and the subsequent conversion of the melted metal into steel.

Already known in the art are methods for melting or remelting particulate metal.

According to such a method, particulate metal is introduced and melted in a melting furnace, such as a Siemens Martin furnace or an electric furnace, in which the degree of heat exploitation is relatively low, for example 35% in a Siemens Martin furnace, which is caused by the decreasing temperature differential between the charge and the flame during progress of the melting process. A further reason is the poor utilization and the heat losses which result from the spatial arrangement of the melting flames with regard to the scrap metal.

As regards cupola furnaces, they have no real bearing on the subject invention in that instead of subjecting pure particulate metal to combustion in the furnace, the metal scrap admitted into the cupola furnace already contains the fuel requisite for the melting of the scrap metal.

Generally speaking, and in accordance with conventional melting practices, the metal scrap is melted by means of a flame directed from above onto the metal. This, however, has the inherent disadvantage that in response to increase of the melting time, the heat transfer between the flame and the charge becomes poorer, even to the extent that in certain extremes, a stationary condition sets in between the flame and the upper layer of the charge with the result that the lower layers remain predominantly unmelted and untouched by the heat of the flame.

Also known are furnaces in which the melting chamber consists at least in part of a refractory material and in which the charge is heated and melted by means of a flame or other kind of heat radiation which passes over the lower surfaces of the charge and/or is reflected by the roof of the furnace onto the top layer of the charge so as to obtain a substantially overall equal penetration of heat into the charge.

This, however, has the disadvantage, that not only the charge is subjected to the heat but also the refractory material with which the melting chamber is either entirely or in part provided, which leads to excessive stress of the refractory material which negatively influences the operation of the furnace, especially at high temperatures.

In addition, such furnaces are extremely complicated as regards their construction and uneconomical as regards their operation and maintenance.

SUMMARY OF THE INVENTION

An object of the present invention is to provide a method for melting particulate material according to which the charge is uniformly melted and subsequently converted into steel.

A further object of the present invention is to provide a method for melting particulate material which can be carried out in an apparatus of simple construction and in which the refractory material of the apparatus is protected from the flame, which improves the economy and operation of the apparatus.

With these and other objects in view, the method of the present invention mainly comprises the steps of admitting a charge of particulate metal, especially scrap iron, into an elongated upright melting chamber, contacting the leading, i.e., the lower end of the charge with a disc-shaped flame spread transversely through the melting chamber and arranged upwardly from the bottom wall thereof so that the metal of said charge melts and flows onto the bottom wall, thereby becoming interposed between the flame and the bottom wall to protect the latter from the former, and evacuating the melted metal from the melting chamber.

The flame is preferably produced by a mixture of fuel with oxygen to provide the high temperature necessary to burn free a space for the transversely spread flame.

The fuel-oxygen mixture for the flame is introduced into the melting chamber through a preferably centrically arranged lance the end of which is properly spaced from the bottom wall of the melting chamber so that a disc-shaped flame will form at the end of the lance, if at the initial ignition care has been taken to provide a proper free space for such a disc-shaped flame adjacent the bottom wall of the melting chamber. Such a free space may, for instance, be provided by placing an easily ignitable body, for instance a block of wood, onto the bottom wall of the melting chamber before filling the charge into the latter, and by igniting the wood block before starting the flame.

According to a further feature of the present invention, the melted scrap iron is discharged in a container already filled with a certain amount of liquid pig iron, which furnishes due to the combustion of its carbon and elements, for instance, lime, also fed in the metal bath, a turbulence necessary for the production of steel and which will produce the necessary heat balance equalization. This is important since the melted scrap is essentially heated in the melting chamber only to the temperature of the liquids.

According to a further feature of the method of producing steel from the melted scrap iron, the percentage of oxygen in the fuel-oxygen mixture for producing the flame is so regulated so that the flame will have an oxidizing effect on the charge. By properly adjusting the amount of oxygen in the fuel-oxygen mixture, it is possible to obtain in the melted scrap discharged from the melting chamber into the liquid pig iron in the container, such an amount of FeO that the amount FeO together with the necessary addition of lime will produce a reactive slag so that the refining process will proceed without the necessity of introducing oxygen directly into the metal bath in the container as is necessary in other steel producing methods.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
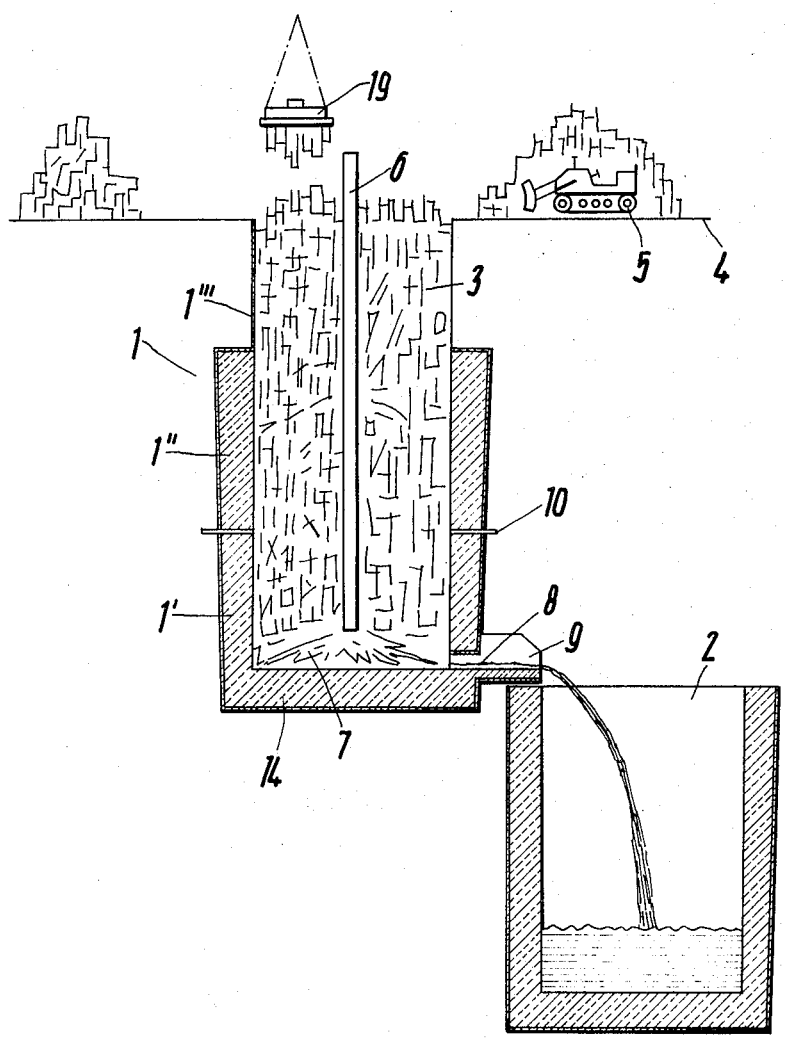
FIG. 1 is a cross-sectional view of a melting apparatus according to the present invention.

Referring now to the drawings in which like reference numerals index like parts, and with attention initially directed to FIG. 1, the melting apparatus 1 for melting particulate material 3 is provided with a receptacle 2 which is fixedly connected to the apparatus 1. The apparatus 1 is in the form of an upright substantially elongated cylindrical shaft which is seen to comprise an open upper end 1a and a closed bottom wall 14.

The particulate metal 3 is admitted into the hollow interior of the shaft 1 in the form of an axially extending column which has an overall uniform outer diameter which is substantially equal to the inner diameter of the shaft.

In the instant embodiment, the particulate material 3 is charged into the shaft from a platform 4 by means of a mobile transport device 5 and a magnet 19.

Extending coaxially with the longitudinal axis of the shaft is a lance 6 which is provided with a lance head from which the melting flame 7 issues. As shown, the lance 6 extends centrally through the charge column 3 while the head thereof opens in a region substantially spaced from the bottom wall 14.

The flame 7 is disc-shaped and acts against the leading end of the charge 3.

The flame 7 extends substantially over the entire surface of the leading end and, due to its shape and its location relative to the bottom wall 14, heats the charge in such a way that the latter melts and flows onto the bottom wall 14 and is thereby interposed between the flame and the bottom wall, whereby the bottom wall is protected from the flame by the interposed metal which subsequently is evacuated from the melting chamber via an outlet 8 in the chamber wall 1'. A spout 9 communicates with the outlet 8 so as to convey the melted metal into the receptacle 2.

As shown, the shaft 1 consists of these sections 1', 1" and 1''', respectively. The lower section 1' comprises a lining made of a basic refractory material while the center section 1" comprises a lining of fire bricks for reasons that the heat impact on this center section is essentially smaller than on the lower section 1'. The upper section 1''' does not need a fire resistant lining for reasons that the heat impact in this section is totally negligible.

The lower section 1' is exchangeable by means of the flange connection 10.

Figure 2:
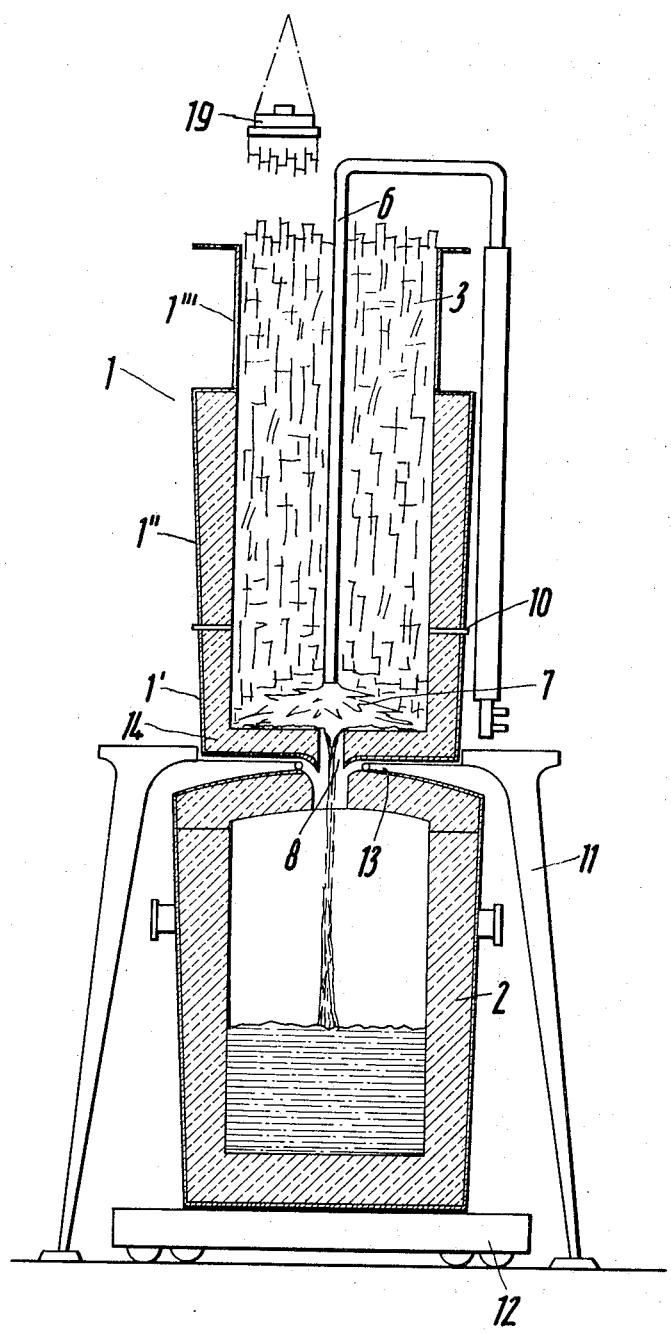
FIG. 2 is a further embodiment of the apparatus of FIG. 1.

FIG. 2 shows the shaft and melting arrangement of FIG. 1, however, arranged with an exchangeable receptacle 2 which is movable on the support 12 and which communicates with the shaft furnace 1 via an opening 8 which is centrally arranged in the bottom wall 14. The shaft furnace 1 itself is supported on a support 11 and the space intermediate the bottom wall 14 and the upper portion of the receptacle 2 is filled by a sealing member or gasket 13.

Figure 3:
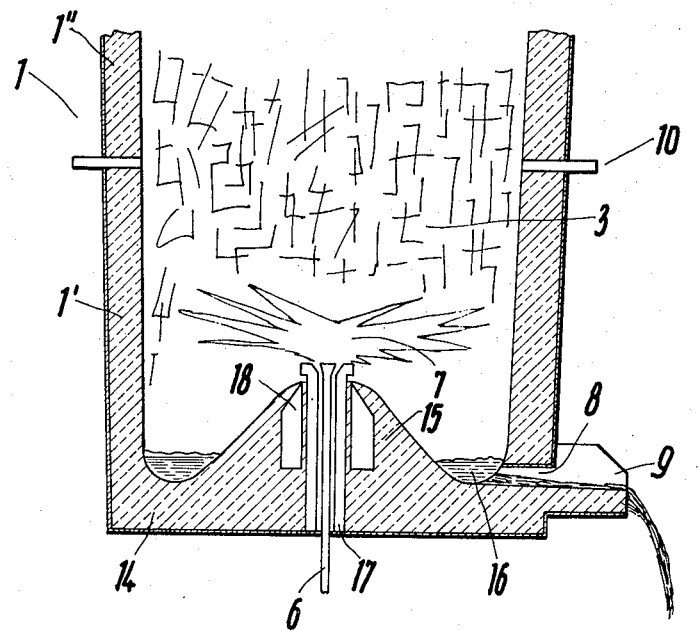
FIG. 3 is a part cross-sectional view of a still further embodiment of the apparatus of FIG. 1.

Shown in FIG. 3 is a still further embodiment of the apparatus in which the bottom wall 14 comprises a central opening in which the lance 6, which in this instance extends through the bottom wall 14, is supported and guided by a rod shaped member 17.

Surrounding the member 17 is an upwardly directed projection 15 which, in turn is surrounded by a trough-shaped groove 16 for the collection of melted metal. The groove 16 communicates with a discharge opening 8 and a spout 9 for evacuating the melted metal from the shaft 1.

Also surrounding the lance 6 and the guide support 17 is a cooling chamber 18 which is operative to cool excessive heat of the lance 6 by means of cooling water circulated through the cooling chamber.

The charge introduced into the melting chamber is preferably scrap iron, and the flame 7 is produced by combustion of a fuel-oxygen mixture fed through the lance 6. The oxygen percentage of the mixture is preferably adjusted in such a manner to produce an oxidizing effect on the scrap iron during melting thereof, so that the melted metal discharged from the melting chamber contains a certain amount of FeO. The receptacle or container 2 into which the melted metal from the melting chamber 1 is discharged is partly filled with pig iron to which lime is added, to produce with the FeO content of the metal discharged into the container an active slag causing combustion of the carbon content of the pig iron and reduction of the FeO content of the melted scrap iron, while simultaneously creating a turbulence in the metal bath in the container to thereby transform the metal into steel without the necessity of blowing additional oxygen into the metal bath. In other words, the proper refining of the metal bath in the metal container 2 may be accomplished by properly adjusting the oxygen percentage of the fuel-oxygen mixture fed into the lance 6.

The weight relationship of scrap iron to be melted in the melting chamber 1 and added to the pig iron in the container 2 is preferably 9:1. This relationship is chosen since with the method of the present invention the melted scrap discharged into the container will contain slightly more than 10% FeO.

An output of 3.5 t./m.$^2$/hour is obtained with a heat input of 1500 Mcal./m.$^2$/hour, whereby m.$^2$ is the available hearth surface of the melting chamber. This means that the melting efficiency is over 80%, whereas the efficiency of Siemens-Martin furnaces is only in the region of 30%.

For an output of 30 t. of melted scrap iron per hour, 60 kg. oil and 100 Nm.$^3$ oxygen are needed per ton of scrap iron.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of melting scrap iron comprising the steps of admitting a charge of particulate scrap iron into an upright elongated melting chamber comprising a bottom wall; contacting the lower end of said charge with a disc-shaped flame produced from an oxygen-fuel mixture, said flame being spread transversely through said melting chamber and being arranged upwardly of said bottom wall so that the metal of said charge melts and flows onto said bottom wall thereby becoming interposed between said flame and said bottom wall and protecting the latter from the former; and continuously discharging the melted metal from said melting chamber.

2. A method as defined in claim 1, and including the step of continuously discharging the melted metal from said melting chamber into a container containing liquid pig iron.

3. A method as defined in claim 2, and including the step of regulating the percentage of oxygen in said fuel oxygen mixture in such a manner to produce in the melted scrap iron discharged from the melting chamber an amount of FeO sufficient to reduce the pig iron in said container to steel.

4. A method as defined in claim 3, and including the step of adding lime to the metal bath in the container to produce together with the FeO content of the melted scrap iron discharged from the melting chamber into the container a reactive slag to refine the metal bath in the container into steel without blowing additional oxygen into the metal bath in the container.

5. A method as defined in claim 2 and including the step of confining the particulate scrap iron in the melting chamber in the shape of column having throughout its length an equal diameter.

6. A method as defined in claim 2 and comprising the step of directing said flame over substantially the entire cross section of said lower end of said charge.

References Cited

UNITED STATES PATENTS

| | | | |
|---|---|---|---|
| 3,578,793 | 5/1971 | Jones et al. | 75—60 UX |
| 3,223,521 | 12/1965 | Stone | 75—44 S |
| 2,671,724 | 3/1954 | Kompart | 75—43 |
| 3,034,887 | 5/1962 | Henne | 75—60 |
| 3,232,748 | 2/1966 | Rinesch | 75—60 |
| 3,663,203 | 5/1972 | Davis et al. | 75—43 |
| 3,603,571 | 9/1971 | Geiger, Jr. | 75—43 |
| 3,424,573 | 1/1969 | De Villiers | 75—43 |
| 3,231,369 | 1/1966 | Gorlich et al. | 75—46 |
| 3,234,010 | 2/1966 | Mahony | 75—43 |
| 2,786,748 | 3/1957 | De Laval, Jr. | 75—43 |
| 2,586,315 | 2/1952 | Eyt et al. | 75—43 |

CHARLES N. LOVELL, Primary Examiner

M. J. ANDREWS, Assistant Examiner

U.S. Cl. X.R.

75—43, 44 S, 46